United States Patent [19]
Attwood et al.

[11] Patent Number: 5,441,829
[45] Date of Patent: Aug. 15, 1995

[54] ELECTROCHEMICAL CELL

[75] Inventors: Geoffrey Attwood, Alderwasley, England; Werner G. Grasse, Berlin, Germany

[73] Assignee: AABH Patent Holdings Societe Anonyme, Luxembourg

[21] Appl. No.: 121,941

[22] Filed: Sep. 15, 1993

[30] Foreign Application Priority Data

Sep. 17, 1992 [GB] United Kingdom ............... 9219704

[51] Int. Cl.[6] .................................... H01M 2/30
[52] U.S. Cl. .............................. 429/158; 429/160; 429/178
[58] Field of Search ............... 429/178, 158, 159, 160, 429/123

[56] References Cited

U.S. PATENT DOCUMENTS

| | | | |
|---|---|---|---|
| 1,651,726 | 12/1927 | Osterman | 429/158 |
| 1,723,727 | 8/1929 | Eckstein | 429/158 |
| 4,581,306 | 4/1986 | Hasenauer et al. | 429/158 X |

FOREIGN PATENT DOCUMENTS

| | | |
|---|---|---|
| 260101 | 5/1913 | Denmark . |
| 0142029A3 | 5/1985 | European Pat. Off. . |
| 416210 | 4/1910 | France . |
| 9311103 | 4/1995 | France . |
| 4109379 | 10/1991 | Germany . |
| 2-148575 | 6/1990 | Japan . |
| 2-135663 | 8/1990 | Japan . |
| 5-266875 | 1/1994 | Japan . |
| 390896 | 4/1933 | United Kingdom . |
| 1447503 | 8/1976 | United Kingdom . |
| 2219430 | 6/1989 | United Kingdom . |
| 9319237 | 11/1993 | United Kingdom . |

OTHER PUBLICATIONS

Article marked "Attachment 1", date and place of publication unknown

Sahm and Sudworth, "Track and Road Testing of a Zebra Battery Powered Car," *Proceedings: DOE/EPRI Beta (Sodium/Sulfur) Battery Workship VIII*, EPRI GS-7163, Project 1084-33, Section 31, Feb., 1991.

*ABB-Hochenergiebatterie fur Elektro-Fahrzeuge und Spitzenlastdeckung*, date and place of publication unknown.

Nelson and Kaun, "Modeling of Lithium/Sulfide Batteris for Electric Vehicles and Hybrid Vehicles", *Proc. of the 26th IECEC*, Aug. 1991, 3:423-428.

*Primary Examiner*—John S. Maples
*Attorney, Agent, or Firm*—Arnold, White & Durkee

[57] ABSTRACT

The invention provides an electrochemical cell having a housing in the form of a canister having a floor and at least one side wall, and an open end opposite the floor, the open end being closed off by a closure and the closure having a periphery connected to the canister at its open end. The cell has a pair of electrodes respectively provided, at the open end of the housing, with electrode terminals. One of said terminals is an outer terminal electronically continuous with the housing at the periphery of the closure, the housing forming a current collector for one of the electrodes. The other terminal is a central terminal electronically continuous with a separate current collector for the other electrode, which separate current collector projects longitudinally inwardly from the cell closure, radially inwardly of the periphery of the closure, being electronically insulated from the housing. The outer terminal projects laterally outwardly from the periphery of the housing to overhang, at a position spaced longitudinally outwardly from the closure, a side wall of the housing. The terminals are arranged so that the cell can be arranged side-by-side with an identical cell with its outer terminal in contact with the central terminal of said identical cells. The invention also provides for a battery of identical electrochemical cells as described above. Furthermore, the invention provides for the fabrication of an electrochemical cell as described above.

10 Claims, 8 Drawing Sheets

ELECTROCHEMICAL CELL

This application is a United States counterpart to the United Kingdom Application Serial No. 9219704.5, which was filed Sep. 17, 1992. Applicant claims the priority date of this foreign filing.

THIS INVENTION relates to an electrochemical cell. It also relates to a battery of electrochemical cells; and to a method of fabricating an electrochemical cell.

According to one aspect of the invention there is provided an electrochemical cell having a housing in the form of a canister having a floor and at least one side wall, and an open end opposite the floor, the open end being closed off by a closure, the closure having a periphery connected to the housing at said open end, the cell having a pair of electrodes respectively provided, at the open end of the housing, with electrode terminals, one of said terminals being an outer terminal electronically connected to the housing at the periphery of the closure, the housing forming a current collector for one of the electrodes, and the other of the terminals being a central terminal electronically connected to a separate current collector for the other electrode, which separate current collector protrudes longitudinally inwardly from the cell closure, radially inwardly of the periphery of the closure, being electronically insulated from the housing, the outer terminal projecting laterally outwardly from the periphery of the housing to overhang, at a position spaced longitudinally outwardly from the closure, a side wall of the housing, the terminals being arranged so that the cell can be arranged side-by-side with an identical cell with its outer terminal in contact with the central terminal of said identical cell.

The outer terminal may provide at least one contact face for abutting against a complementary contact face on the central terminal of a said identical cell, when the cells are arranged side-by-side, the central terminal in turn providing at least one complementary contact face for abutting against a said contact face on the outer terminal of a said identical cell when the cells are arranged side-by-side.

The contact faces of the terminals may face axially or longitudinally, ie in a direction parallel to the longitudinal dimension of the housing, being the direction from its floor to its upper end or vice versa. Instead, the contact faces of the terminals may face transversely outwardly relative to said longitudinal dimension.

While the cell housing may be cylindrical and of circular cross-sectional outline, so that it has a single curved side wall, it is preferably prismatic, being optionally of hexagonal or rectangular, e.g. square, cross-section, to facilitate close-packing, in which case it has four rectangular side walls, the closure in this case being square in outline and having its periphery made up of four side edges. In the case of a prismatic cell of square cross-section, the outer terminal may project laterally outwardly, at a central position, from one of the side edges of the closure. In this case the central terminal is conveniently arranged so that the cell can be placed side-by-side with an identical cell, with any side wall of each cell in face-to-face abutment with any side wall of the identical cell, except that the side walls on said cells which are overhung by their outer terminals cannot be placed in abutment with each other.

The outer terminal may comprise a flat flange which projects laterally outwardly, whereby an axially facing contact face is provided, flat and perpendicular to each side wall, the central terminal similarly comprising a flat flange, parallel to the flange of the outer terminal, which provides an axially facing contact face. Instead, the flat flange of the outer terminal may have an upstanding rim which provides a transversely outwardly facing contact face, the central terminal having an upstanding peripheral rim which provides the or each contact face thereof, also facing transversely outwardly. In another variation of the invention, the central terminal, which may omit its flange and, instead, may comprise the outwardly protruding free end of the associated current collector, may project longitudinally outwardly from the cell closure, perpendicular to the flange of the outer terminal, which flange has a slot or opening for providing a socket for receiving the central terminal of an identical cell, the periphery of the slot or opening providing the contact face of the flange. In a particular construction, the flange of the central terminal may have an outline which has the same shape as the cross-sectional outline of the housing, being smaller than said cross-section. The flange of the central terminal may have an elongated slot forming a socket therein, in which the outwardly protruding free end of the associated current collector is located, preferably fast therewith by welding. The outer end of this current collector may be chisel-shaped, and may be in the form of an end of a metal pipe which has been sealed by crimping and welding.

In a variation of the invention, one of said flat flanges may have a said upstanding rim, the other said flat flange having an elongated slot therethrough forming a socket wherein at least part of the rim of an identical cell is receivable when the cells are arranged side-by-side. In this construction the flange of the outer terminal may have the slot, the flange of the central terminal having the rim and the rim being divided into portions, at least one of which is receivable in the slot.

As mentioned above, when the outer terminal comprises a flat flange which projects laterally outwardly, said flat flange having a slot or opening therethrough forming a socket wherein the outwardly protruding current collector is receivable when identical cells are arranged side-by-side, the slot or opening can receive the end of said central terminal, conveniently being fast therewith by welding. In this case the central terminal may be the outer end of a tubular associated current collector, being chisel-shaped and the flange of the outer terminal being a complementary-shaped slot.

The invention extends to a battery of electrochemical cells, each cell being as described above and each cell having at least one of its terminals in contact with a terminal of another identical cell, the cells being arranged in side-by-side arrangement with outer and central terminals thereof being in contact in complementary pairs.

Preferably the cells are close-packed, being separated only by insulating spaces or insulating material, e.g. a composite mica-based material 0,3–0,6 mm thick, sufficiently thick to insulate the cells electronically from each other; and the terminals of the cells, where they are in abutment, are optionally welded together or otherwise interconnected.

Further according to the invention in the fabrication of electrochemical cells an electrochemical cell having a housing in the form of a canister having a floor and at least one side wall, and an open end opposite the floor, the open end being dosed off by a closure, the closure having a periphery connected to the housing at its open end, the cell having a pair of electrodes respectively provided with electrode terminals at the open end of the housing, one of said terminals being an outer terminal electronically connected to the housing at the periphery of the closure, the housing forming a current collector for one of the electrodes, and the other of the terminals being a central terminal electronically connected to a separate current collector for the other electrode, which separate current collector protrudes from the cell closure inwardly of the periphery of the closure, being electronically insulated from the housing, there is provided a method of fabrication which comprises:

employing a closure which is of metal and connecting the outer terminal thereto by welding so that the outer terminal projects laterally outwardly from the periphery of the housing to overhang, at a position spaced longitudinally outwardly from the closure, a side wall of the housing; and employing a metal current collector for the separate current collector which protrudes from the cell closure and welding an outer end of this current collector into an opening or socket in the central terminal.

In a particular embodiment of the method, the cell closure may have an upstanding rim via which it is connected to the housing wall or walls, in which case the outer terminal may have a base which is welded to the inside of said rim.

In a further particular embodiment of the method, the current collector which protrudes from the cell closure may be in the form of a filler pipe for an electrode compartment in the cell, and the method of the present invention may include the step of crimping the free end of the filler pipe to provide it with a chisel-shaped edge, the central terminal being provided with an opening in the form of an elongated slot, and the chisel-shaped edge being located in this slot and welded to seal it and to connect it to the central terminal.

BRIEF DESCRIPTION OF THE DRAWINGS

The invention will no be described, by way of non-limiting illustrative example, with reference to the accompanying diagrammatic drawings, in which:

In FIG. 1 of the drawings, reference numeral 10 generally designates an electrochemical cell in accordance, with the present invention. The cell 10 has a housing 12 in the form of a mild steel casing of square cross-section whose lower end (not shown) is closed off by a mild steel floor. The housing 12 is accordingly in the form of a canister having a square floor and four rectangular side walls 14, and an open upper end. The upper or open end of the canister, shown in FIG. 1, is closed off by a closure, generally designated 16. The closure 16 is square in outer peripheral outline, having an upstanding rim 18 along its outer periphery, via which it is connected to the upper ends of the inner surfaces of the side walls 14 of the housing 12, by being hermetically welded face-to-face therewith.

Figure 1:
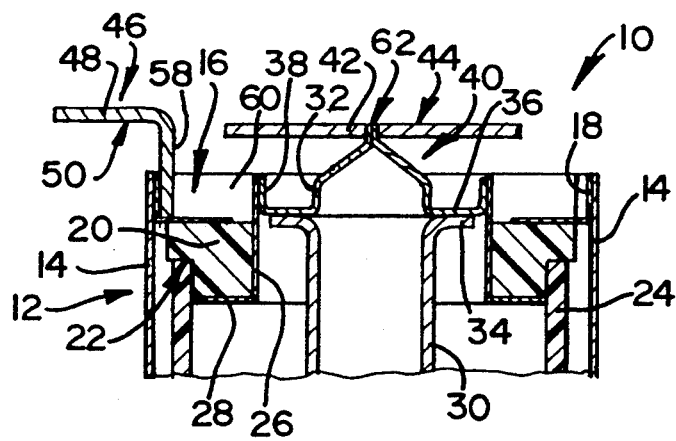
FIG. 1 shows a schematic sectional side elevation of part of an electrochemical cell in accordance with the present invention.

The closure 16 is of nickel and has a central opening, and its lower surface is hermetically thermocompression bonded to the upper surface of an $\alpha$-alumina sealing ring 20. The sealing ring 20 is in the form of a truncated cylinder of more or less rectangular cross-section, and is provided at its radially outer and lower corner with a rebate 22, in which is received the rim of the open end of a solid electrolyte separator tube 24, the opposite end (not shown) of which is dome-shaped and closed. The separator tube 24 is of $\beta''$-alumina.

The radially inner surface of the sealing ring 20 abuts the curved outer surface of a cylindrical nickel tube 26 which is centrally located and extends axially. The nickel tube 26 has a radially outwardly projecting circumferentially extending nickel flange 28 at its lower end, and this flange 28 is thermocompression bonded to the lower surface of the sealing ring 20, the thermocompression bond to the sealing ring 20 being hermetic.

The housing 12, as emerges in more detail hereunder, forms a current collector for one of the electrodes of the cell. A nickel current collector for the other of the electrodes of the cell is provided in the interior of the tube 26. The current collector in the tube 26 comprises a tubular lower portion 30 which projects downwardly into the associated electrode contained in the interior of the separator tube 24, and an upper tubular pipe portion 32.

The lower tubular portion 30 has a radially outwardly projecting circumferential flange 34 at its upper end, the upper portion 32 similarly having a circumferentially extending radially outwardly projecting flange 36 at its lower end. The flange 36 has an upstanding peripheral rim 38, hermetically welded into the upper end of the tube 26. The lower surface of the flange 36 is in turn hermetically welded to the upper surface of the flange 34, the portions 30 and 32 both being of nickel.

The interior of the separator tube 34 contains a cathode (not shown) which may comprise a transition metal matrix, e.g. of Ni or Fe, which is porous and permeable to molten salt electrolyte, the matrix being impregnated with an NaAlCl, molten salt electrolyte comprising equimolar proportions of NaCl and $AlCl_3$ and having $NiCl_2$, or $FeCl_2$, as the case may be, dispersed in its porous interior in its charged state. The space between the separator tube 24 and the casing 12 will contain molten sodium as anode material. Naturally, instead, the interior of the separator tube 24 can instead contain sulphur as cathode material.

The upper end of the pipe 32 is crimped closed so that it is chisel-shaped and has upwardly converging walls as shown at 40, so that the nickel pipe of the upper portion 32 of the central current collector terminates in an upwardly directed crimped edge. This crimped edge is received in a slot in a central (cathode) cell terminal 42 which is of square outline, having side edges respectively parallel to the side edges of the closure 16, the upper edge of the nickel pipe 32 being welded into the slot in the cathode terminal 42. This welding also serves to ensure that the crimped upper edge of the nickel pipe 32 is hermetically sealed. The terminal 42 is in the form of a flat flange presenting an axially upwardly facing contact face 44. The terminal 42 is described in more detail hereunder with reference to FIGS. 6 and 7.

The cell 10 has an outer or anode terminal 46. This terminal is welded to the rim 18 of the closure 16 as described in more detail hereunder with reference to FIGS. 8–10, and, like the terminal 42, provides a flange having a contact surface. In the case of the outer terminal 46 the flange is designated 48 and presents an axially downwardly facing contact face 50.

Figure 2:
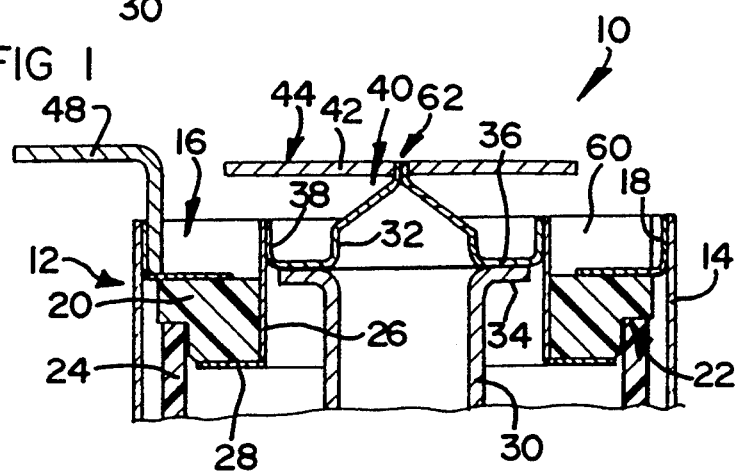
FIG. 2 shows a similar view of part of the housing of the cell of FIG. 1.
Figure 3:
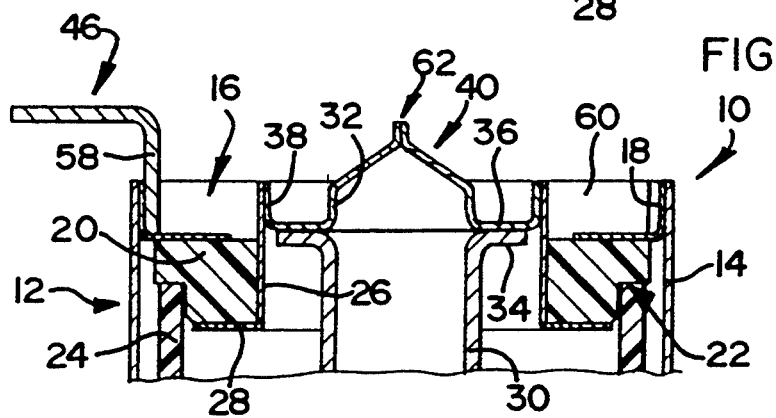
FIG. 3 shows the part of FIG. 2, during construction thereof.
Figure 4:
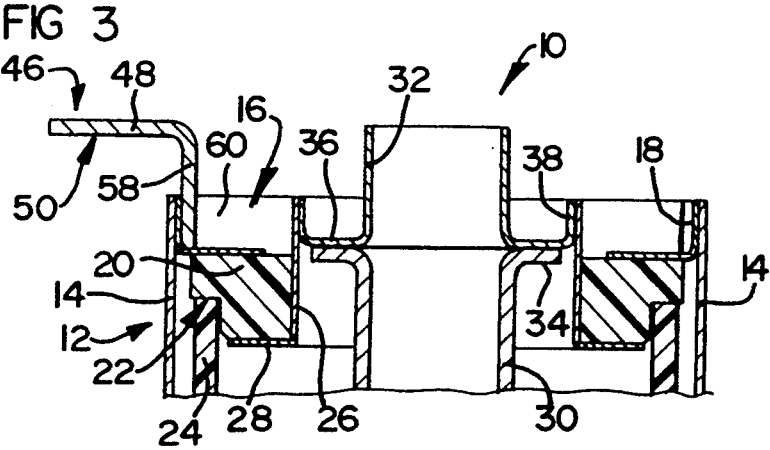
FIG. 4 shows the part of FIG. 3 during an earlier stage of the construction thereof.

Turning to FIGS. 2–4, the same reference numerals are used for the same parts as in FIG. 1, unless otherwise specified.

Figure 5:
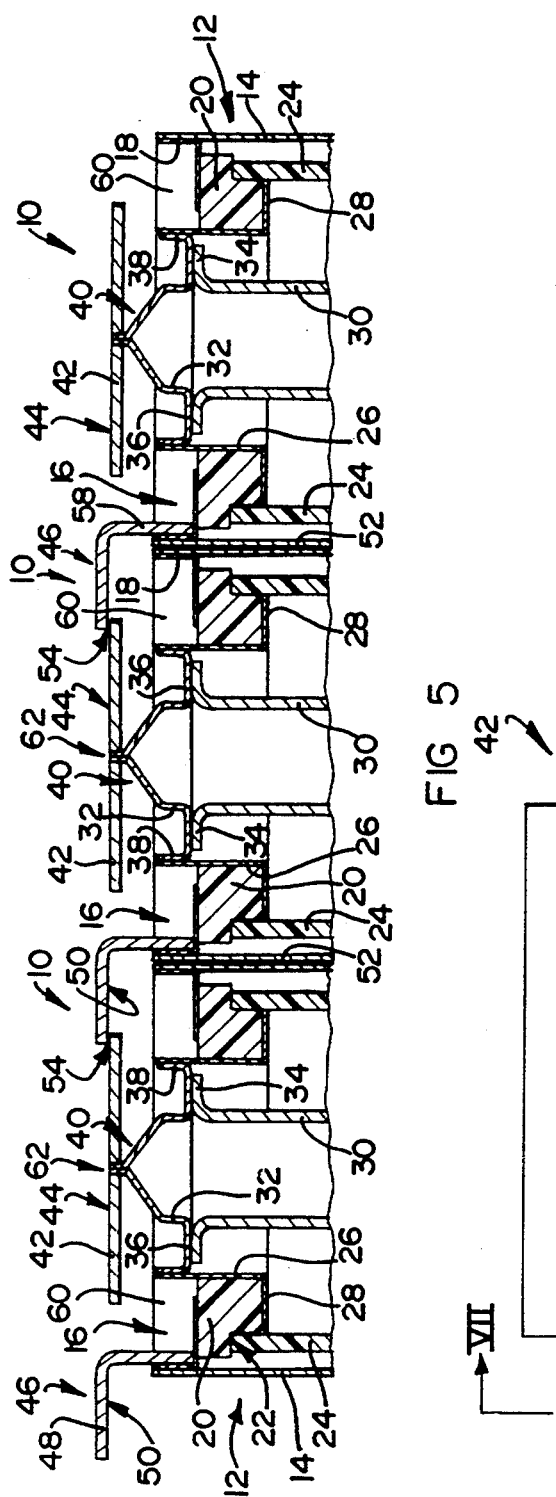
FIG. 5 shows a view similar to FIG. 1 of a plurality of cells in accordance with FIG. 1 connected together in series to form at least part of a battery.

In FIG. 5, three cells 10 in accordance with FIG. 1 are shown interconnected in series, to form part of a battery. The cells 10 of the battery are arranged side-by-side in rectangular close packed relationship, their side walls 14 being electronically insulated from one another by thin layers 52 of composite mica material of about 0,3–0,6 mm thickness.

As is clear from FIG. 5, each of the cells 10 is connected to another of the cells 10 by having the contact face 50 of its terminal 46 abutting downwardly against the contact face 44 of the central terminal of the other cell. The contact face 44 of each terminal 42 in turn abuts in similar fashion upwardly against the contact face 50 of the terminal 46 of the other cell 10 to which it is connected. This abutment is shown at 54 and is reinforced by having said terminals 42, 46 welded together at 54.

Figure 7:
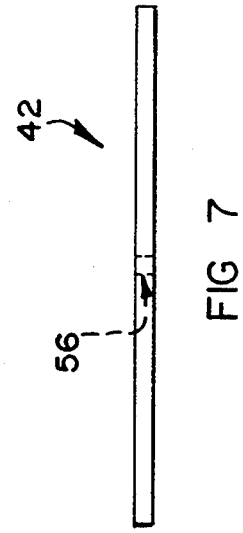
FIG. 7 shows a side elevation of the detail of FIG. 6 in the direction of line VII—VII in FIG. 6.
Figure 6:
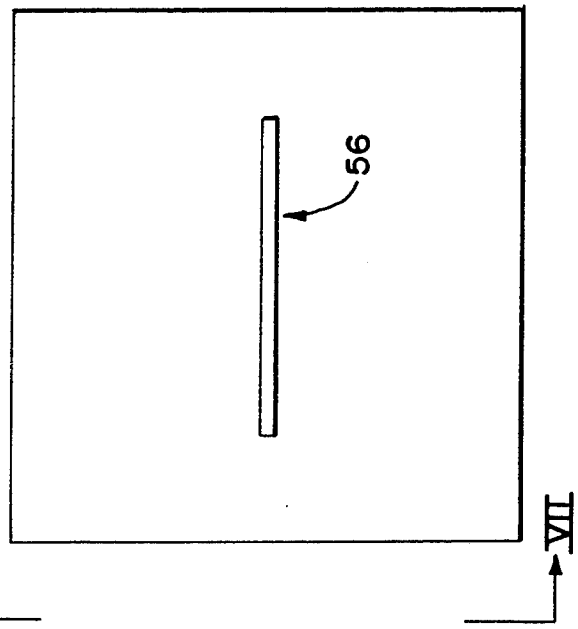
FIG. 6 shows in plan view and on an enlarged scale the central terminal of the cell of FIG. 1.

Turning to FIGS. 6 and 7, the central or cathode terminal is designated 42, its opening or slot which receives the upper crimped edge of the nickel tube 32 being designated 56.

Figure 8:
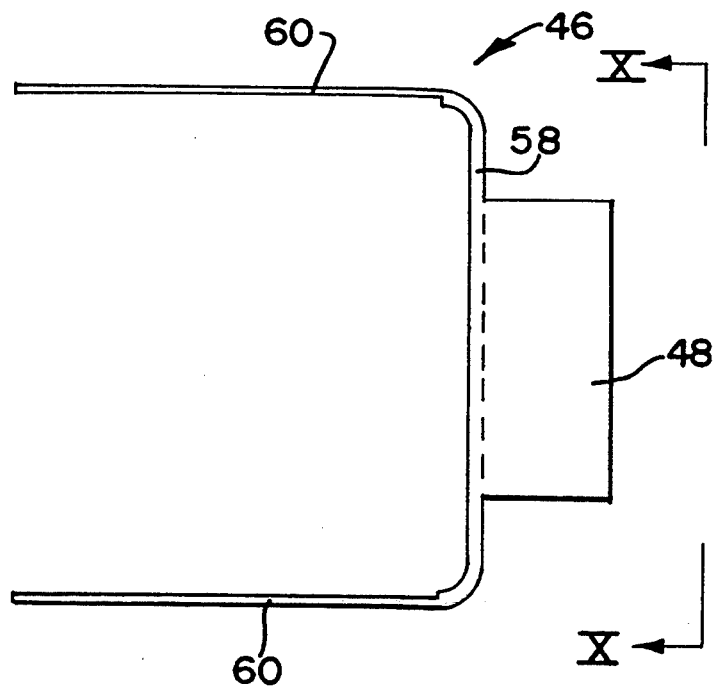
FIG. 8 shows in plan view and on an enlarged scale the outer terminal of the cell of FIG. 1.
Figure 9:
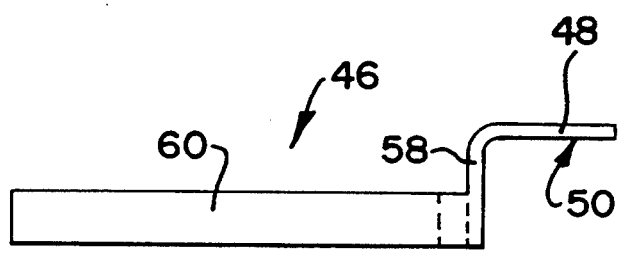
FIG. 9 shows a side elevation of the outer terminal of FIG. 8.
Figure 10:
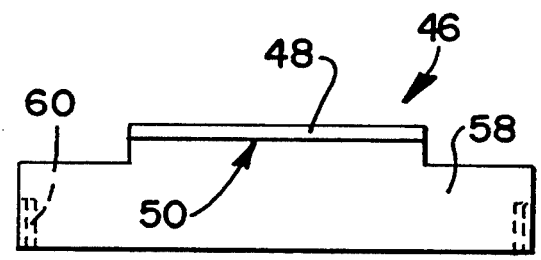
FIG. 10 shows an end elevation, in the direction of line X—X in FIG. 8, of the outer terminal of FIG. 8.

Turning to FIGS. 8–10, the outer or anode terminal is designated 46. Its flange 48 which provides the contact face 50 projects outwardly from a wall 58 (see also FIG. 1) which is welded to the inner surface of one of the sides of the rim 18 of the closure 16. Two parallel limbs 60, also in the form of walls but somewhat thinner and somewhat lower than the wall 58, projects in a direction normal to the wall 58 towards the same side thereof. These limbs 60 are in turn welded to the inner surfaces of the sides of the rim 18 (FIG. 1) on opposite sides of the side of said rim 18 to which the wall 58 is welded.

The wall 58 projects above the upper end of the housing 12 and the flange 48 projects radially outwardly from the upper edge of the wall 58, to stand laterally proud of and overhang the associated side wall 14 of the housing 12. The wall 58 and limbs 60 form a base for the outer terminal 46.

When the cell is assembled together, it is assembled with the pipe 32 open and uncrimped, as shown in FIG. 4. When the contents of the separator tube 24 have been loaded therein via the tube 32, the open end of the tube 32 is crimped closed as shown in FIG. 3 to provide a crimped upper edge for the tube 32 at 62. The edge 62 is then inserted into the slot 56 of the terminal 42, and is welded in position there, the welding sealing the crimped edge 62 (FIG. 2).

It is a particular advantage of the cells described with reference to FIGS. 1–10 that the construction and arrangement of the terminals 42, 46 permit close packing of cells in a square-close-packed arrangement as shown in FIG. 5, with considerable flexibility as regards connecting the cells together. Each cell has three sides, namely those sides other than the side from which its terminal 46 projects, from which it can receive the terminal 46 of an adjacent cell, for connection to its terminal 42. Accordingly, the cells can merely be loaded to a tray or similar housing, side-by-side with the insulation 52 therebetween, and, provided that no two terminals 46 interfere with each other, the terminals 42, 46 of the cells will automatically be in abutment or closely spaced at their contact faces 44, 50. It will be noted in this regard that, for each cell, the contact faces 44 and 50 are substantially coplanar. Furthermore, the terminals 42, 46 can easily and simply be fabricated, and can easily be connected in position by welding, as described above.

Figure 11:
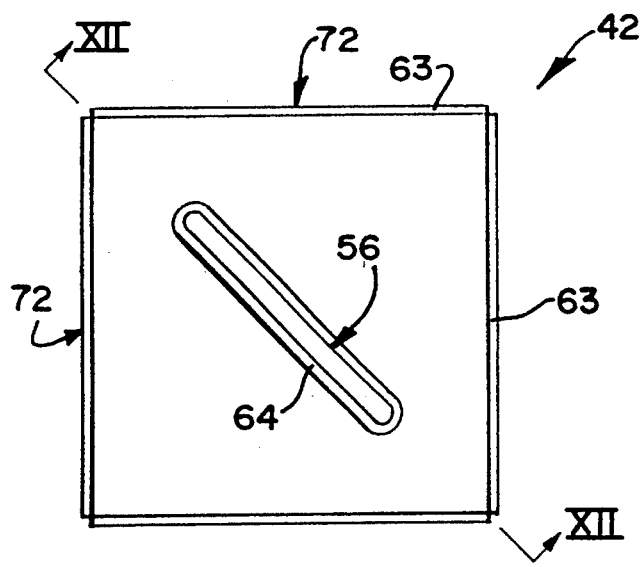
FIG. 11 shows a view similar to FIG. 6 of a variation of the central terminal.
Figure 12:
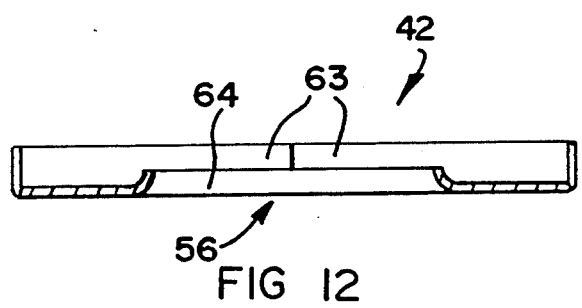
FIG. 12 shows a sectional side elevation of the terminal of FIG. 11, in the direction of line XII—XII in FIG. 11.

In FIGS. 11 and 12 the same reference numerals are used for the same parts as in FIGS. 6 and 7, unless otherwise specified. The principal difference between FIGS. 11 and 12 on the one hand and FIGS. 6 and 7 on the other, is that the slot 56 extends diagonally relative to the outline of the terminal 42 in FIGS. 11 and 12, which permits the slot to be relatively longer, if required, relative to the size of the terminal 42 and its edges. Furthermore, the edges of the terminal 42 are provided with an upstanding rim 63; and the slot 56 is provided with an upstanding peripheral rim 64.

Figure 15:
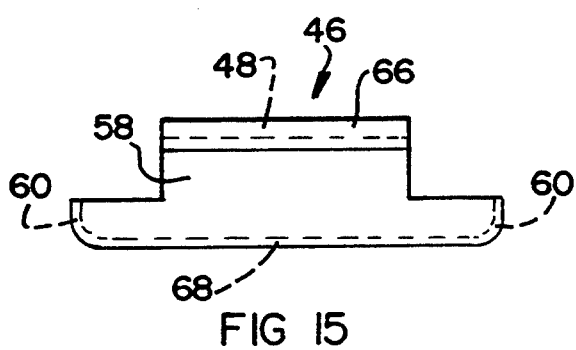
FIGS. 13–15 show respectively views corresponding to FIGS. 8–10 of a variation of the outer terminal.
Figure 13:
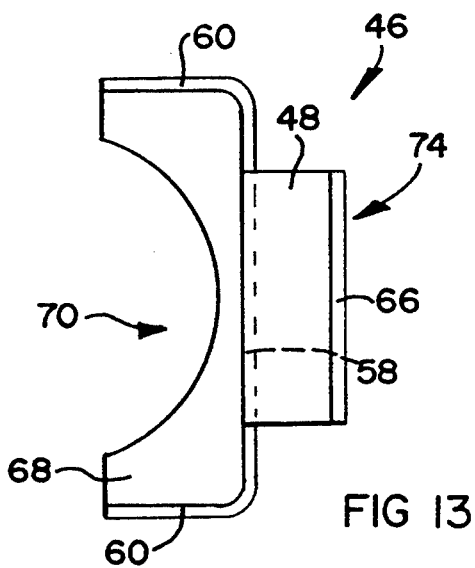
Figure 14:
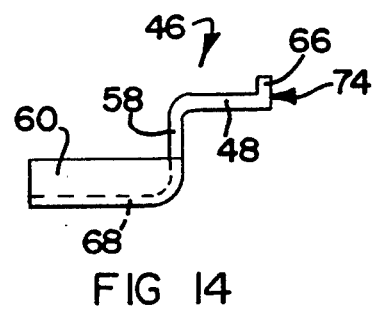

In FIGS. 13–15, similarly, the same reference numerals are used for the same parts as in FIGS. 8–10, unless otherwise specified. The principal difference between the terminal 46 of FIGS. 13–15 and that of FIGS. 8–10, is that the flange 48 has an upstanding rim 66 at its free edge. Furthermore, the limbs 60 are relatively somewhat shorter in FIGS. 13–16, compared with those of FIGS. 8–10; and a web 68 having a semi-circular indentation 70 therein, interconnects the lower edges of the walls 58, 60 to provide an increased surface area for contact with the closure 16, for improved electronic conductivity between the terminal 46 and the closure 16.

It will be appreciated, with reference to FIGS. 11–15, that the transversely outwardly facing surfaces of the rim 63 provide the contact faces of the terminal 42, designated 72, the transversely outwardly facing surface of the rim 66 of the terminal 46 providing its contact face, designated 74.

Figure 16:
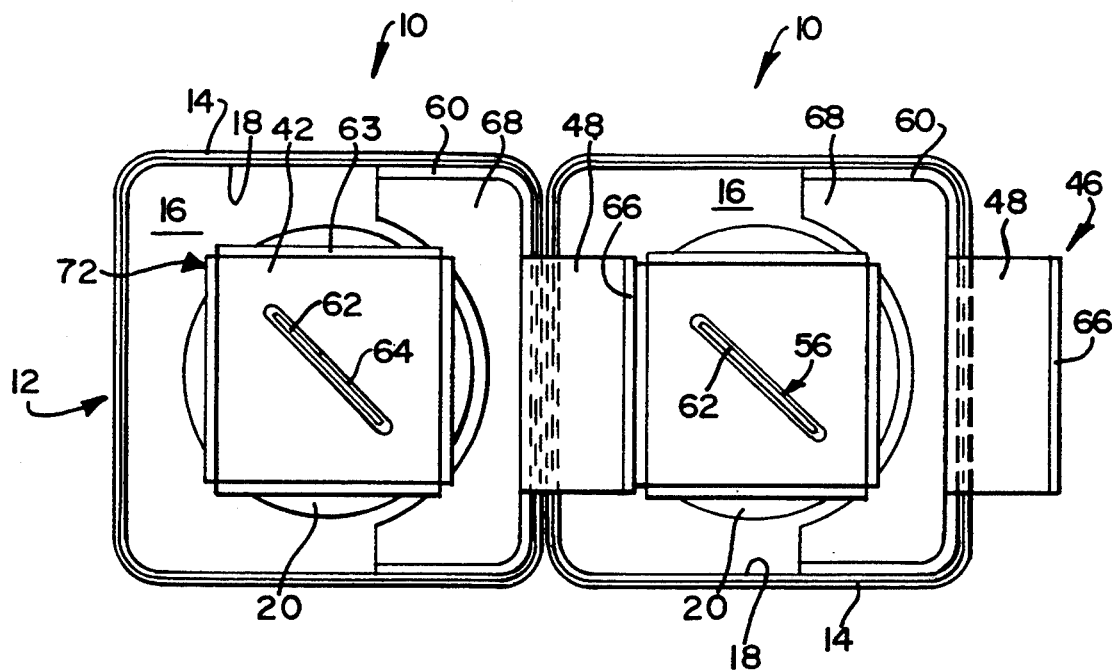
FIG. 16 shows a plan view of two cells employing the terminals of FIGS. 11 connected together to form at least part of a battery.
Figure 17:
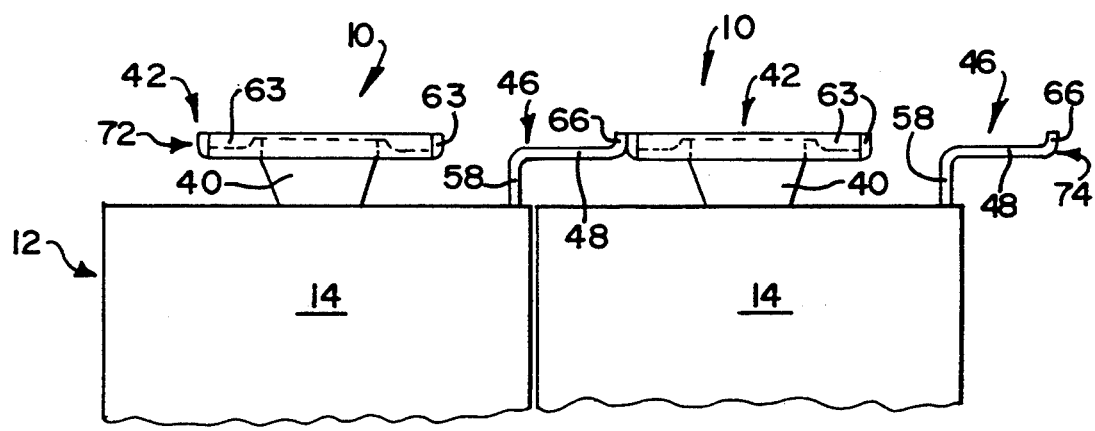
FIG. 17 shows a side elevation of the cells of FIG. 16.

In FIGS. 16 and 17, the same reference numerals refer to the same parts as in FIGS. 1–15 unless otherwise specified. Attachment of the inner terminals 42 to the upper ends of the tubes 32 is essentially similar to the attachment described above with reference to FIGS. 1–4, as is attachment of the terminals 46 to the closure 16, except that the tube 32 is crimped so that its chisel-shaped upper end runs diagonally relative to the plan view outline of the associated housing 12 so that it registers with the slot 56 of the terminal 42; and the web 68 of the terminal 46 is welded to the upper surface of the closure 16 as well as to the rim 18 of the closure 16.

To connect the cells together via said terminals 42 and 46, they are arranged side-by-side as shown in FIGS. 16 and 17, and the contact face 74 of each terminal 46 is welded to the corresponding contact face 72 of the terminal 42 of the adjacent cell. Substantially similar advantages and flexibility of cell assembly in forming a battery are provided by the construction shown in FIGS. 11–18, as are provided in the construction shown in FIGS. 1–10.

Figure 18:
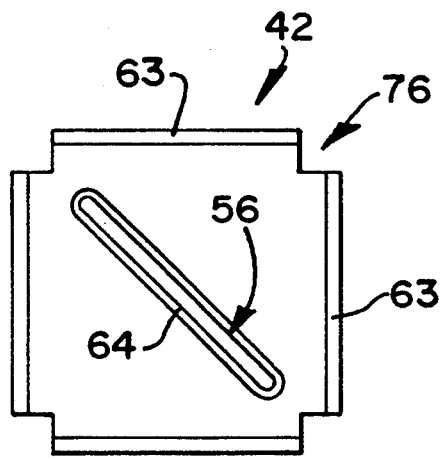
FIG. 18 shows a view similar to FIG. 11 of a further variation of the central terminal.

In FIG. 18 the same reference numerals are used as in FIG. 11 for the same parts, unless otherwise specified. The main difference between FIGS. 18 and 11 is that the central terminal 42 in FIG. 18 has notches at its corners at 76 which divide the rim 63 into four portions.

Figure 19:
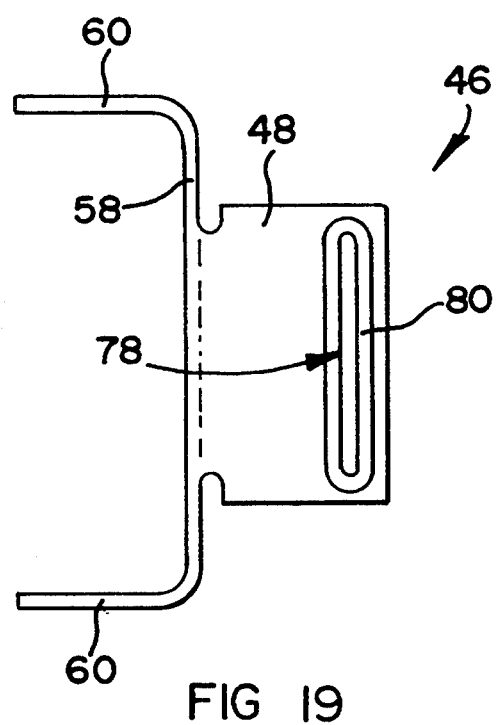
FIGS. 19–21 show respectively views corresponding to FIGS. 8–10 of a further variation of the outer terminal.
Figure 20:
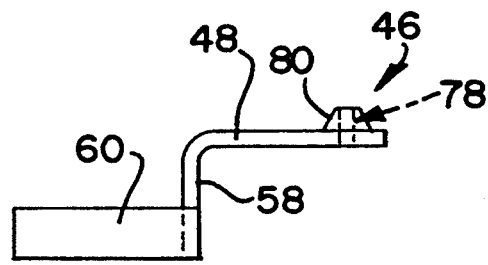
Figure 21:
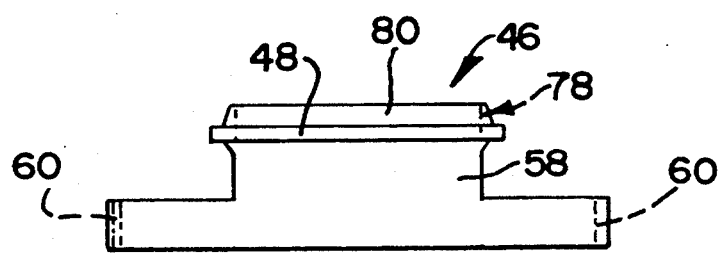

In FIGS. 19–21 the same numerals are used as in FIGS. 8–10 for the same parts, unless otherwise specified. The main difference between FIGS. 19–21 and FIGS. 8–10 is that the flange 48 in FIGS. 19–21 is provided with an elongated slot 78 which forms a socket and which is provided with an upstanding rim 80. In use the rim 63 of the central terminal 42 is received in the slot 78 of the outer terminal 46 of an adjacent like cell, being welded in position there.

Figure 22:
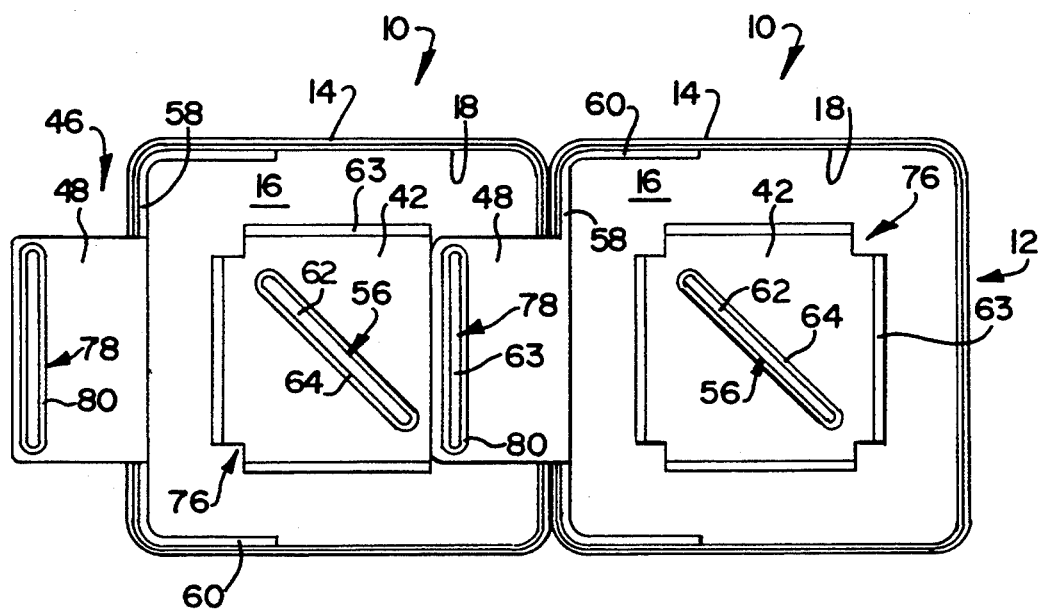
FIG. 22 shows a view similar to FIG. 16 of two cells employing the terminals of FIGS. 18–21.
Figure 23:
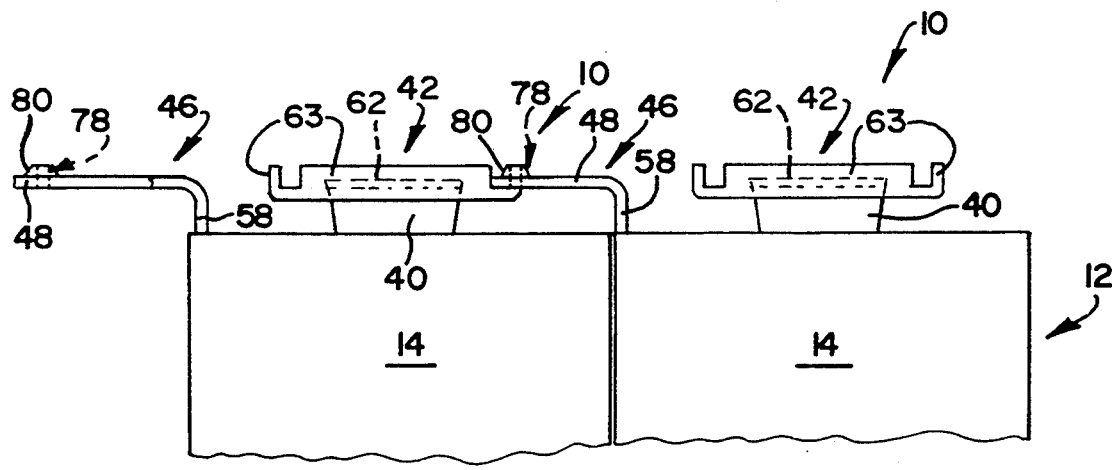
FIG. 23 shows a side elevation of the cells of FIG. 22.

In FIGS. 22 and 23 the same numerals are used for the same pans as in FIGS. 16 and 17, unless otherwise specified. The main difference between FIGS. 22 and 23 on the one hand, and FIGS. 16 and 17 on the other, is that contact between the terminals 42, 46 in FIGS. 22 and 23 is not via contact faces such as the faces 72, 74 as shown in FIGS. 16 and 17, but is instead by receiving one of the portions of the rim 63 of the terminal 42 in the slot 78 of the terminal 46 of an adjacent like cell, where it is welded in position.

Figure 24:
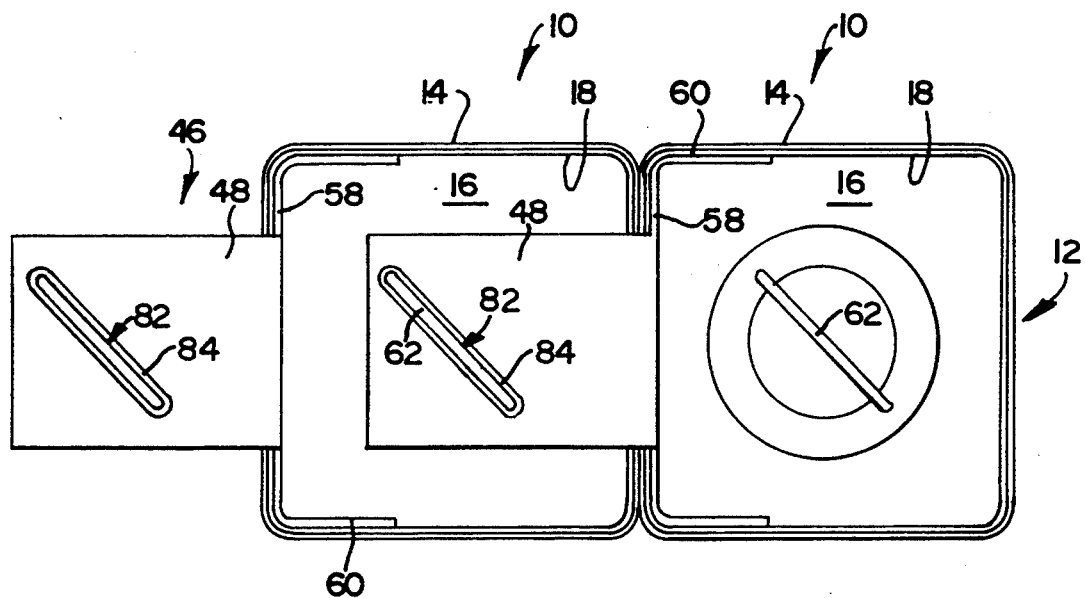
FIG. 24 shows a view similar to FIG. 22 of two cells according to a further embodiment of the invention.
Figure 25:
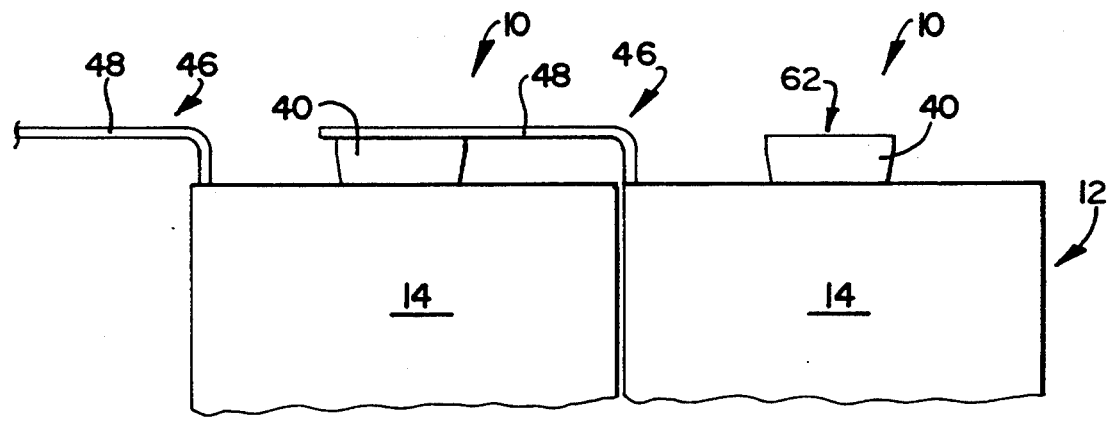
FIG. 25 shows a side elevation of the cells of FIG. 24.

Finally, in FIGS. 24 and 25 the same reference numerals are used for the same parts as in FIGS. 22 and 23, unless otherwise specified. The main difference between FIGS. 22 and 23 and FIGS. 24 and 25 is that, in FIGS. 24 and 25, the inner terminal 42 does not have a flat flange, but, instead, the outer terminal 46, and in particular its flange 48, is extended laterally so that the crimped upper free edge 62 of the nickel pipe 32 can be inserted into an elongated slot 82 having a rim 84 and provided for the edge 62 in the terminal 46. The edge 62 is then welded into the slot 82 in the terminal 46, which slot 82 is parallel to the edge 62 for this purpose.

The embodiments of FIGS. 18–25 have substantially the same advantages and flexibility of cell assembly in forming a battery as are described above for the constructions of FIGS. 1–17.

We claim:

1. An electrochemical cell having a housing in the form of a canister having an end provided with a floor, at least one side wall, and an open end opposite the floor, each side wall of the canister extending longitudinally from the floor to the open end of the canister, the open end being closed off by a closure, the closure having a periphery connected to the canister at its open end, the cell having a pair of electrodes respectively provided, at the open end of the housing, with electrode terminals, one of said terminals being an outer terminal having a first portion electronically continuous with the housing at the periphery of the closure and radially inwardly, relative to the longitudinal direction, of each side wall of the canister, the housing forming the current collector for one of the electrodes, and the other of the terminals being a central terminal electronically continuous with a separate current collector for the other electrode, which separate current collector projects longitudinally inwardly from the cell closure, radially inwardly of the periphery of the closure, being electronically insulated from the housing, the outer terminal having a second portion projecting radially outwardly from the periphery of the closure to overhang, at a position spaced longitudinally outwardly from the closure, a side wall of the housing, the terminals being arranged so that the cell can be arranged side by side with an identical cell with its outer terminal in contact with the central terminal of said identical cell.

2. An electrochemical cell as claimed in claim 1, in which the outer terminal provides at least one contact face for abutting against a complementary contact face on the central terminal of a said identical cell, when the cells are arranged side-by-side, the central terminal in turn providing at least one complementary contact face for abutting against a said contact face on the outer terminal of another said identical cell when the cells are arranged side-by-side.

3. An electrochemical cell as claimed in claim 2, in which the outer terminal comprises a flat flange which projects radially outwardly, whereby its contact face is provided, flat and perpendicular to each side wall and facing longitudinally, the central terminal comprising a flat flange, parallel to the flange of the outer terminal, which provides its contact face, also facing longitudinally.

4. An electrochemical cell as claimed in claim 2, in which the outer terminal comprises a flat flange which projects radially outwardly, the flat flange of the outer terminal having an upstanding rim which provides its contact face, facing radially outwardly, the central terminal comprising a flat flange, parallel to the flange of the outer terminal and having an upstanding peripheral rim which provides the contact face thereof, also facing radially outwardly.

5. An electrochemical cell as claimed in claim 2, in which the outer terminal comprises a flat flange which projects radially outwardly, the central terminal comprising a flat flange, parallel to the flange of the outer terminal, one of said flat flanges having an upstanding rim, the other said flat flange having an elongated slot therethrough forming a socket for receiving at least part of the rim of a said identical cell when the cells are arranged side-by-side, said slot and rim providing the contact faces.

6. An electrochemical cell as claimed in claim 3, in which the flange of the central terminal has an elongated slot forming a socket therein, the current collector associated with the central terminal having an extension which protrudes longitudinally outwardly from the closure, being located in the socket and in electronic contact therewith.

7. An electrochemical cell as claimed in claim 2, in which the outer terminal comprises a flat flange which projects radially outwardly, the central terminal comprising an extension of the associated current collector and projecting longitudinally outwardly from the closure, said flange having a socket for receiving the central terminal of a said identical cell when the cells are arranged side-by-side, the socket and the extension providing the contact faces of the terminals.

8. A cell as claimed in claim 1, the cell having a polygonal cross-section which permits a plurality of said cells to be packed together, side-by-side in a close-packed array, each cell having a plurality of rectangular side walls, the outer terminal comprising a flat flange which projects radially outwardly, the closure having an outer peripheral outline which corresponds with said cross-section, and having a plurality of side edges, the outer terminal projecting radially outwardly, at a central position from one of said side edges.

9. A battery of identical electrochemical cells, each cell having a housing in the form of a canister having an end provided with a floor at least one side wall, and an open end opposite the floor, each side wall of the canister extending longitudinally from the floor to the open end of the canister, the open end being closed off by a closure, the closure having a periphery connected to the canister at its open end, the cell having a pair of electrodes respectively provided, at the open end of the housing, with electrode terminals, one of said terminals being an outer terminal having a first portion electronically continuous with the housing at the periphery of the closure and radially inwardly, relative to the longitudinal direction, of each side wall of the canister, the housing forming a current collector for one of the electrodes, and the other of the terminals being a central terminal electronically continuous with a separate current collector for the other electrode, which separate current collector projects longitudinally inwardly from the cell closure, radially inwardly of the periphery of the closure, being electronically insulated from the housing, the outer terminal having a second portion projecting radially outwardly from the periphery of the closure to overhang, at a position spaced longitudinally outwardly from the closure, a side wall of the housing, the terminals being arranged so that the cell can be arranged side by side with an identical cell with its outer terminal in contact with the central terminal of said identical cell and each cell having at least one of its terminal in electronic contact with a terminal of another said cell, the cells being arranged in side by side arrangement with each cell forming part of at least one pair of cells, the outer terminal of one cell of each said pair being in electronic contact with the central terminal of the other cell of said pair.

10. A battery as claimed in claim 9, in which the terminals of each pair of terminals which are in contact with each other are welded to each other.

* * * * *